Aug. 29, 1972   W. LUGSCHEIDER ET AL   3,687,823
METHOD OF PRODUCING SUPERCONDUCTIVE CAVITY
RESONATORS, PARTICULARLY FOR
PARTICLE SEPARATORS
Filed May 27, 1970   4 Sheets-Sheet 1

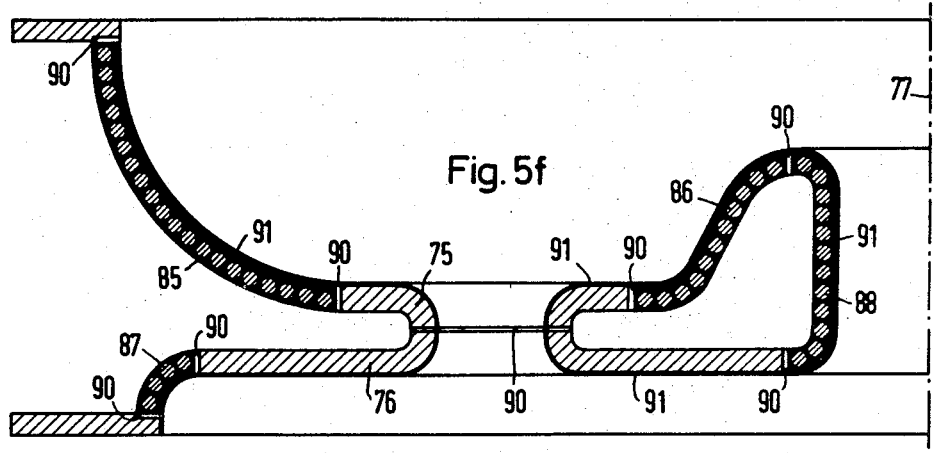

United States Patent Office

3,687,823
Patented Aug. 29, 1972

---

3,687,823
METHOD OF PRODUCING SUPERCONDUCTIVE CAVITY RESONATORS, PARTICULARLY FOR PARTICLE SEPARATORS
Walter Lugscheider, Munich, and Richard Maier, Erlangen, Germany, assignors to Siemens Aktiengesellschaft, Munich and Berlin, Germany
Filed May 27, 1970, Ser. No. 40,799
Claims priority, application Germany, May 31, 1969,
P 19 27 825.2
Int. Cl. C23b *5/00, 7/00, 17/00*
U.S. Cl. 204—3                   13 Claims

ABSTRACT OF THE DISCLOSURE

A process for producing a superconductive cavity resonator, particularly for particle accelerators, by precipitation of niobium layer on the surface of a metallic carrier structure. A niobium carrier structure is formed. A niobium layer is formed by molten bath electrolysis. The formed carrier with layer is then degassed under high vacuum.

---

Our invention relates to a method for producing superconductive cavity resonators, particularly for particle accelerators, by precipitating a niobium layer on the surface of a metallic carrier structure.

In superconductive cavity resonators, particularly for particle accelerators, the superconductivity of a surface layer of superconducting material is utilized. Niobium is particularly well suited as a superconducting material. A high-frequency absorption takes place in the superconducting surface layer. To keep this high-frequency absorption low and thus the power loss also, the surface layer should be as homogeneous as possible and should be free of contaminations, that is the surface layer should possess the highest possible residual resistance ratio. By "residual resistance ratio," we mean the ratio from the electrical resistances in a normal-conducting state of the surface layer, at a temperature of 298° K. and at a temperature of 4.2° K. The ratio rises rapidly when the impurity content is reduced. To purify the surface layer from impurity elements, in order to obtain a high residual resistance ratio, the most suitable method is a degassification annealing, in a high vacuum, at temperatures from about 2000° C. and above.

One has tried to produce resonator cavities of massive niobium (article by C. Passow in "Elektrotechnische Zeitschrift" Issue A, vol. 89 (1968), pages 341 to 346). Though such resonators may be subjected to a degassification annealing, surprisingly sufficiently high residual resistance ratios cannot be obtained thereby. Specific tests have shown that this can be traced to the metallic impurities contained in the massive niobium, particularly tantalum, which can not be removed from the niobium by degassification annealing.

It was further tried to fashion the carrier structures for the resonator cavities from copper and to precipitate by electrolysis a nibium layer thereupon (see article by C. Passow). Methods for the electrolytical precipitation of niobium on copper, wherein the fused bath electrolyte is represented particularly by molten niobium fluorides and alkali fluorides (article by G. W. Mellors and S. Senderoff in "Journal of the Electrochemical Society," vol. 112 (1965), pages 266 to 272). Niobium layers which are placed upon customary copper carriers through this method, have the disadvantage that, even when the electrolytes are of the highest purity and free of metallic contaminations and the protective gas atmosphere used in the precipitating device is of the highest possible purity, such great amounts of gaseous impurities, particularly of oxygen, become installed into the niobium layers, that the superconducting properties of these niobium layers are considerably worse than those of pure niobium. More particularly, the residual resistance ratio of the niobium layers is insufficiently high. A purification of these niobium layers through degassification annealing that would require temperatures above 2000° C. because of the copper carrier, cannot be pursued. One could consider, of course, to separate the niobium layers from the copper carriers and to anneal them, thereafter. However, this would necessitate very thick niobium layers and thus long precipitation times and a very high technical output. Also, additional difficulties occur thereby in that the niobium layers which are freely carried after their separation from the copper carrier, may be easily deformed by creeping as a result of the high annealing temperatures and of the long annealing periods, which, because due to the usually very small tolerances, is most disadvantageous for the dimensioning of the resonator cavities.

It is an object of our invention to provide a method for producing superconducting cavity resonators, by precipitating a niobium layer on the surface of a metallic carrier structure, where the aforedescribed disadvantages may be eliminated and where very pure surface layers of niobium may be obtained.

According to the invention this method comprises forming a carrier structure of niobium, forming a niobium layer on the inner side of the carrier structure by molten bath electrolysis and then degassing the layered carrier structure under high vacuum.

Our method has the great advantages, that massive niobium of conventional purity is used for the carrier structure and a very high residual resistance ratio may be obtained, due to degassification annealing in the niobium layer, which is electrolytically precipitated upon the carrier structure and which contains considerably less metallic impurities than the carrier structure. While, for example, in association with niobium laminations of conventional purity, even at long-period annealing, conducted at temperatures of 2000° C. and above, due to metallic impurities, a residual resistance ratio of about 100 can virtually not be exceeded, residual resistance ratios of about 500 to 1500 may easily be obtained in the electrolytically precipitated niobium layer, by degassification vacuum annealing.

The niobium layer precipitated by fused bath electrolysis should preferably be of such thickness that even at long term annealing over many hours, the metallic impurities from the carrier structure cannot push forward through diffusion, into the surface zone of the niobium layer (which is up to several microns in thickness), where the high frequency absorption takes place. Such diffusion would reduce, in this surface zone, the high residual resistance ratio obtained by degassification. The glow period for the degassification annealing is preferably so selected that the gaseous impurities, which are absorbed by the carrier structure during the fusion electrolytical precipitation, could be completely diffused through the precipitated niobium layer and diffused out of the same. It was found particularly advantageous, to precipitate by fusion electrolysis, on the inside of the carrier structure, a niobium layer of at least 0.3 mm. thickness and to anneal the coated carrier structure under high vacuum, with a residual gas pressure of $5 \cdot 10^{-8}$ torr or less, for about 15 hours, at a temperature between approximately 2000 and 2050° C.

The carrier structure may be turned, for example, from the full mass of niobium. However, as a rule, this would be uneconomical. It is best to produce the carrier structure of niobium sheets. Simple, for example, cylindrical carrier structures may be produced by bending the sheet and welding the contact edges. Carrier structures of more complicated geometrical shapes, with many curved faces which are particularly required for the resonator cavities of linear accelerators are preferably produced of niobium sheets, by deep pulling. When the geometrical configuration of the carrier structure does not permit production from a single piece, component parts of the carrier structure are, preferably, first produced by deep pulling and interconnected or connected with other component parts, by electron beam welding, prior to the precipitation of the niobium layer, by fusion electrolysis.

It may also be advantageous, prior to the fused bath electrolytical precipitation of the niobium layer to anneal the carrier structure, for several hours, under a high vacuum to a temperature of about 2000° C. and above. An annealing period of about 3 hours at high vacuum with a residual gas pressure of a maximum of $5 \cdot 10^{-8}$ torr and annealing temperatures between approximately 2000 and 2050° C., were found advantageous for carrier structures of niobium sheet. This annealing process serves, first, for a predegassification of the carrier structure. Secondly, this annealing process can lead to a relaxing of the carrier structure and to a recovering of the carrier structure from lattice effects as well as to a gain growth at the surface of said carrier structure, up to a median surface grain size of about 5 mm. By median surface grain size, we mean the median grain diameter, parallel to the surface of the carrier structure, which is intended for the precipitation of the niobium layer. The medium grain size may be established by counting the number of grains per area unit. The relaxing of the carrier structure and the recovery from the lattice effects, first of all, prevents a subsequent undesired deformation of the carrier structure during the fused bath electrolytical precipitation and furthermore, leads to the result that the precipitated niobium layer will grow epitactically on the carrier structure. The niobium layer then has the same grain texture as the surface of the carrier structure intended for precipitation. Such epitactically grown niobium layers are particularly pure and smooth. The purity and the smoothness of the niobium layer increases with an increasing median surface grain size of the carrier structure. Even the slightest elastic tensions in the carrier structure, as well as lattice disturbances in the monocrystalline area of the crystal grains at the surface of the carrier structure, hinders the epitactic growth of the niobium layer. If, prior to the precipitation of the niobium layer, an aftertreatment and smoothening is required for the surface of the carrier structure, intended for the precipitation of the niobium layer, this surface is preferably polished mechanically and/or chemically and/or electrolytically. The same applies for the surface of the precipitated niobium layer.

To produce more complicated cavity resonators with respect to their geometry, one preferably acts in a manner whereby a carrier structure is produced by adjusting a rotation-symmetrical body to the intended shape of the carrier structure and tightly wrapping it with one layer of niobium wire, whereby a mechanical connection of the wire windings is obtained by niobium precipitation effected by fused bath electrolysis. After the removal of the rotational-symmetrical body, the surface of the wire winding facing said body which now defines the carrier structure, may be electrolytically coated with niobium. The rotational-symmetrical body naturally must consist of a material whose melting temperature is higher than the temperature of the fused bath electrolyte and which is not attacked by the latter. Copper is the most suitable material for this purpose.

The fused electrolytical precipitation of niobium toward the mechanical connection of the wire winding is preferably done in many steps, whereby the outer surface of the precipitated niobium layer may be smoothed by mechanical or electrolytical means, between said steps. The coating of the surface of the wire winding facing the rotational-symmetrical bodies, may be effected if necessary in many steps, interrupted by mechanical or electrochemical processing.

It is most preferable to use a niobium wire with a profile which provides an essentially smooth surface of the wire winding, at the surface which faces the rotation-symmetrical body.

In cavity resonators, which are constructed with geometrical complications, it is preferable to first produce component pieces of the carrier structure by wrapping rotational-symmetrical bodies with niobium wire and by precipitating niobium with the aid of fused electrolysis for a mechanical connection of the wire winding and following the removal of the rotational-symmetrical body, to interconnect these components or connect with other component pieces. Thus component parts produced may also be connected with component pieces which were produced by deep pulling of niobium sheets.

An annealing treatment lasting many hours, under a high vacuum and carried out at temperatures of 2000° C. and above, prior to the fused electrolytical precipitation of the niobium layer on the inner side of the carrier structure may also be preferable for carrier structures, that are produced of niobium wire windings.

The fused electrolytical precipitation of the niobium layers may be effected according to known methods. Melts of niobium fluorides and alkali fluorides are particularly suitable electrolytes.

The following figures and embodiments will describe the invention in greater detail:

FIGS. 5a to 5f show schematically, the production of a cavity resonator of component pieces.

FIG. 6 shows a schematic section of another carrier structure for a cavity resonator, composed of component pieces.

Figure 1:
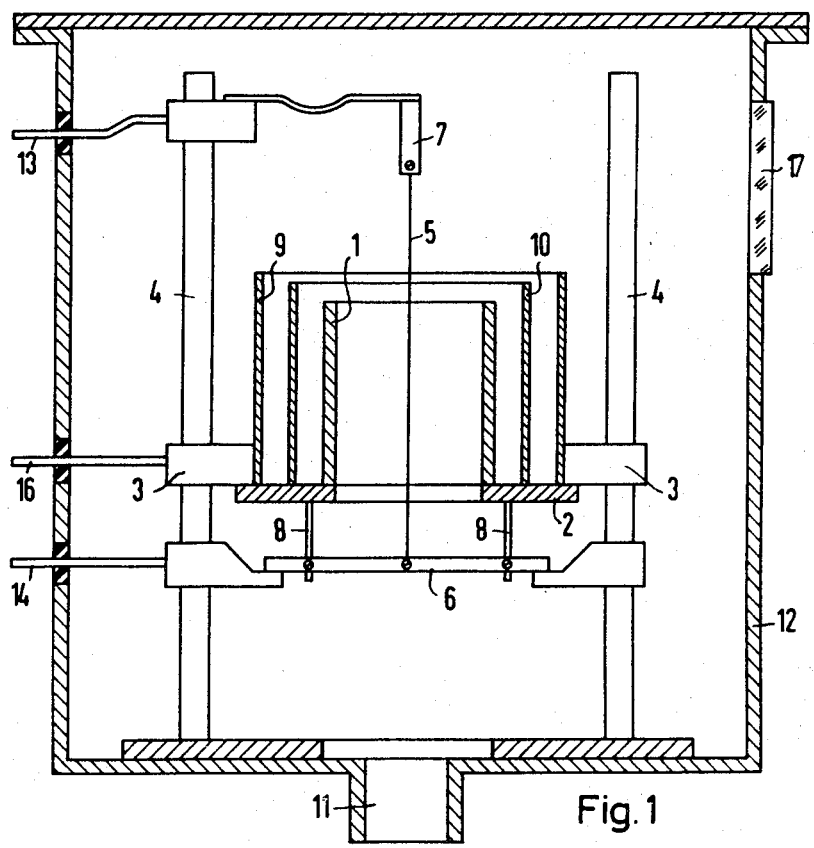
FIG. 1 shows a schematic section of a device for degassification annealing.
Figure 2:
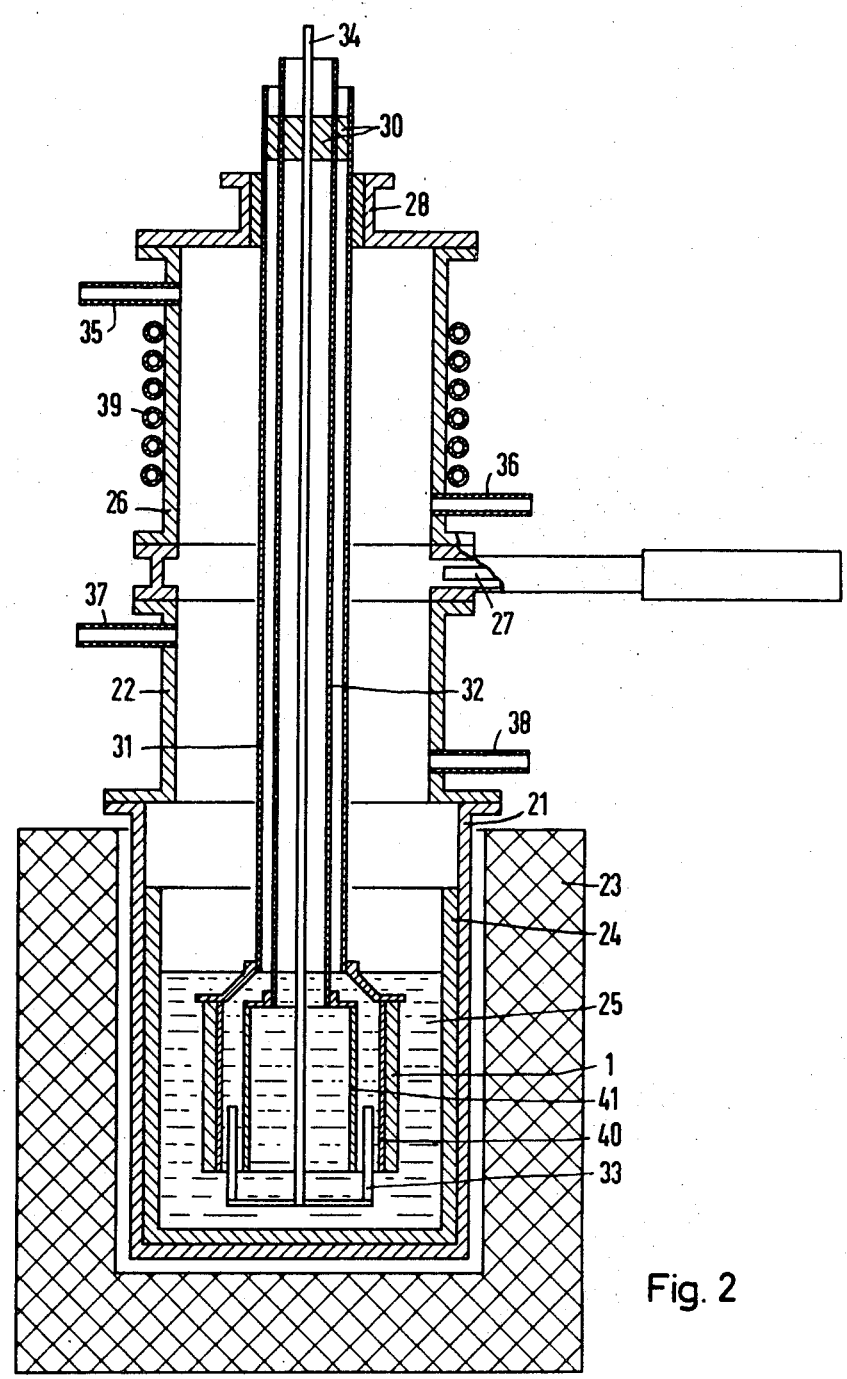
FIG. 2 shows a schematic section of a device for coating a niobium carrier structure by fused bath electrolysis.

The following embodiment example will explain the production of a cylindrical cavity resonator by using the device shown in FIGS. 1 and 2. Such cylindrical cavity resonators, for example, may be used for measuring. To produce the carrier structure, a cylinder is rolled out of a strip, about 2.5 mm. thick, of conventional niobium sheet. Subsequently, the adjacent lateral edges of the strip of laminations are connected by electron-beam welding. Typical metallic impurities values for these conventional niobium laminations, are for example, 2000 p.p.m. of tantalum, 700 p.p.m. iron, 1000 p.p.m. nickel and 200 p.p.m. each of manganese and tungsten. The cylinder height may, for example, be 41 mm. and the inside diameter 42 mm.

For annealing purposes, the niobium lamination cylinder 1 is then placed into the device of FIG. 1 which serves for heating the cylinder by electron bombardment. The device is essentially comprised of a niobium plate 2, having a hole and attached by niobium clamps 3 to aluminum-oxide rods 4, a tungsten cathode 5 is positioned perpendicularly to the surface of the plate 2 and leading through the hole in the plate. The tungsten electrode 5 is stretched between holders 6 and 7 also comprised of tungsten which too are attached to the aluminum oxide rods 4. The electrode may be provided with current via the holders 6 and 7. Thin aluminum oxide rods 8 are provided between the holder 6 and the niobium plate 2 as additional supports. Two niobium cylinders 9 and 10, concentrically arranged relative to each other, serve as radiation reflectors. The device is located in a stainless steel boiler 12 which can be evacuated through nipple 11. The current supply leads 13 and 14 to the heater of the tungsten cathode 5 are in a vacuum-tight relationship with the boiler 12. When the niobium cylinder 1 is inserted into the boiler, the boiler is evacuated up to a residual gas pressure of about $5 \cdot 10^{-8}$ torr. Subsequently, high voltage is applied via leads 14 and 16, between the tungsten cathode 5 and the cylinder 1 which serves as the anode. The cylinder 1 is heated by electron bombardment for about 3 hours, to a temperature of about 2050° C. The temperature is measured optically through the observation window 17, located in the wall of the boiler 12. Following the cooling, the predegassified and relaxed cylinder 1 is removed from the device.

The inside of the niobium cylinder 1 is first polished by grinding or mechanically sand blasting and then electrolytically to smooth the surface intended for the precipitation of the niobium layer. An electrolyte comprising 86% sulphuric acid and 15% hydrofluoric acid is preferred for the electrolytic polishing whereby the niobium cylinder to be polished is used as the anode and niobium also is used as the cathode. If the voltage between the anode and the cathode amounts to about 5 to 9 v. and the bath current density is 20 ma./cm.$^2$, at the anode, then approximately 1 micron niobium per minute will be removed from the surface of the cylinder 1. After a few minutes, cylinder 1 is removed from the electrolyte and cleansed of the electrolyte residues.

This surface treatment may be followed by further annealing of the cylinder in the device of FIG. 1 under the above specified conditions.

Subsequently thereto, the inner side of the cylinder 1 is coated in the device shown in FIG. 2 with a niobium layer 40 by fused electrolysis. This apparatus essentially comprises a stainless steel pot 21 provided with an upper attachment 22, also of stainless steel. The pot 21 and the attachment 22 may be evacuated and rinsed with protective gas. The pot 21 is surrounded by resistance furnace 23. The pot 21 contains therein nickel pot 24, which serves for receiving a fused bath electrolyte 25. The upper part 26 of the attachment 22 serves as a locking chamber which permits changing the niobium carrier, to be coated, at the operational temperature of the electrolyte and which may be separated from the remaining device, through a vacuum-tight slide 27. The upper end of the locking chamber 26 is provided with a vacuum-tight bushing 28 for holding the niobium cylinder 1 and the niobium anode, which permits a vertical movement of the holder. Synthetic rings 30 comprising polytetrafluorethylene are preferred as sealing members. Two nickel tubes 31 and 32 are used for holding the niobium cylinder 1 and the cylindrical niobium anode 41. The nickel tubes 31, 32 are arranged concentrically relative to each other and are electrically insulated, relative to one another. They may be connected with a DC voltage source, not shown. A mixer 33 is also provided and consists of niobium. The mixer may be rotated via shift 34.

The electrolyte 25 is a potassium heptafluoroniobate ($K_2NbF_7$) which is dissolved in a eutectic mixture of sodium fluoride, potassium fluoride and lithium fluoride. The electrolyte thus consists of 16.2% $K_2NbF_7$, 10.5% NaF, 47.0% KF and 26.2% LiF. All percentages are by weight. After the components are inserted into the nickel pot 24, the steel pot 21 and the attachment 22 are first evacuated and then rinsed via nozzles 35 to 38 with protective gas, e.g. argon, having a purity of about 99.99%. The electrolyte 25 is molten by furnace 23 and is heated to a temperature of about 740 to 750° C. The temperature may also be controlled with provided thermoelements, with a protective nickel wrapping, not shown in drawing. The thermoelements are dipped into the electrolyte 25. Thereafter, the locking chamber 26 is separated by means of the slide 27, from the remaining device. The niobium cylinder 1, attached to tube 31 and the niobium anode 41, affixed to the tube 32, are then installed into the locking chamber 26, which is subsequently evacuated and is rinsed with argon via the nipples 35 and 36. While the niobium cylinder 1 is being affixed to tube 31, care must be taken that the affixing does not produce any thermal and elastic tensions in the cylinder 1. After the slide 27 is opened, the niobium cylinder 1 is pushed into the pot 21 and is kept for such time above the electrolyte 25, until it reaches the temperature of the electrolyte. This is necessary because the immediate immersion of the niobium cylinder 1 into the electrolyte 25 would cause the latter to cool on the surface of the niobium cylinder which would impair its coating with niobium. When the cylinder 1 has been heated to the temperature of the electrolyte 25, it, together with the niobium anode 41, is immersed into the electrolyte 25. Subsequently, DC voltage amounting to a maximum of 0.25 v. is applied between the niobium anode 41 and the niobium cylinder 1, connected as a cathode. Niobium is precepitated on the inner side of the cylinder 1 with a current density between about 40 and 50 ma./cm.$^2$. With the aid of the mixer 33, which may be rotated at a speed of 20 r.p.m., the electrolyte may be moved with moderate speed about the niobium cylinder 1. The precipitation speed of the niobium cylinder 1 is 0.5 to 1 micron, per minute.

Following the completion of the precipitation process, for example, a growth of the niobium layer 40 to about 0.4 mm. thickness, the niobium cylinder 1 is pulled from the electrolyte 25 and is cooled, for example, in the locking chamber 26 which can be cooled by a cooling coil 39 traversed by water, to room temperature, with the help or argon and, following the cooling process, the niobium cylinder is removed from the precipitation device. Any still adhering electrolyte residue may be removed in a water bath, at approximately 20° C., using hard plastic brushes.

The niobium layer 40 precipitated by fused electrolysis although it does contain a relatively high share of gaseous impurities, has a much lower share of metallic impurities than the niobium cylinder 1. Typical values for the content of metallic contaminations in a niobium layer 40 are: approximately 100 p.p.m. tantalum, 290 p.p.m. iron and 200 p.p.m. nickel.

Prior to the final degassification annealing, the surface of the niobium layer 40 is chemically cleaned with a polishing liquid, which is comprised for example of nitric acid, hydrofluoric acid and water at a volume ratio of 1:2:4. Following this, the niobium layer 40, even as the niobium cylinder 1, may be additionally mechanically and electrolytically polished as prior to the precipitation of the niobium layer 40. To effect degassification annealing, the niobium cylinder 1, coated with the niobium layer 40, is again placed into the device shown in FIG. 1 and is annealed therein, under high vacuum, with a residual gas pressure of about $5 \cdot 10^{-8}$ torr, for about 15 hours, at a temperature ranging between 2000 and 2050° C. This annealing process removes to the greatest extent, the gaseous impurities from the niobium layer 40 and the niobium cylinder 1, which were absorbed during precipitation by fused electrolysis. The annealing may produce, in the niobium cylinder 1, a residual resistance ratio of about 100, while a residual resistance ratio in a surface region of the niobium layer having a thickness of several microns, be about 1500.

The circular lid used for sealing both sides of the cylindrical cavity resonator, may also be made of niobium sheets and may be coated with niobium and annealed, similarly as the niobium cylinder 1.

Another embodiment of the invention, wherein the carrier structure is produced with niobium wire, will be illustrated in greater detail with reference to FIGS. 3a to 3f.

Figure 3A:
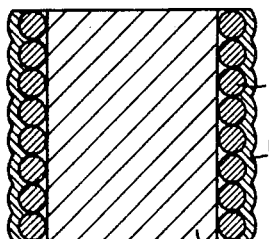
FIGS. 3a to 3f show schematically, several steps during the production of a cavity resonator, according to an embodiment of the invention.
Figure 3B:
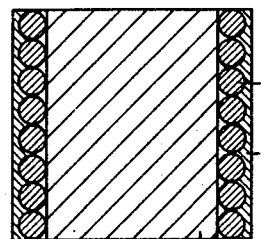
Figure 3C:
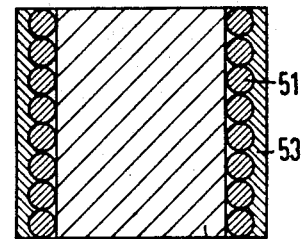
Figure 3D:
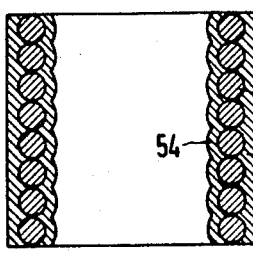
Figure 3E:
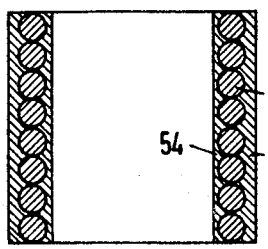
Figure 3F:
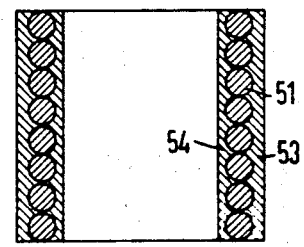

To produce a cylindrical niobium resonator, as shown in FIG. 3a, a niobium wire 51 is first wound in one layer tightly upon a copper cylinder 52, which is equal to the inside dimensions of the desired cylindrical carrier structure. Niobium is then precipitated by means of fusion electrolysis on the outside of the niobium wire winding 51, for such time until an adequately firm mechanical connection has been established for the individual wire windings. The precipitation of the niobium layer 53 may be effected in the device shown in FIG. 2. The arrangement of anode and cathode in the device is to be so varied that the anode will outwardly enclose the niobium wire winding 51. The precipitation is interrupted, after some time and the precipitated niobium layer 53, as shown by FIG. 3b is ground and, if necessary, electrolytically polished. More niobium is precipitated thereafter, upon the smoothed niobium layer 53, by fused bath electrolysis, until a layer thickness of a few tenths of millimeters is obtained (FIG. 3c). After the copper cylinder 52 has been removed, niobium layer 54, is then precipitated by fused bath electrolysis, upon the surface facing the copper cylinder, i.e. upon the inside of the wire winding. This layer, too, is precipitated in several steps, as shown by FIGS. 3d to 3f, whereby the outer surface of the respectively precipitated niobium layer is mechanically or electrolytically smoothed between the steps. The finished cylinder, illustrated in FIG. 3f, is then subjected to the final degassification annealing after an appropriate cleaning process, in the device shown in FIG. 1.

Figure 4:
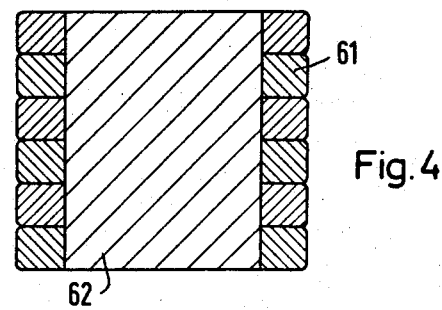
FIG. 4 shows a schematic section of a carrier structure of niobium wire in another embodiment of the invention.

As FIG. 4 shows, the niobium wire 51 of circular cross-section may be replaced by a niobium wire 61 with a rectangular cross-section which affords a very smooth surface of the wire winding, at the surface that faces the copper cylinder 62. The precipitation of the niobium layer at the smooth inside of the wire winding 61, may be effected in one step.

Superconducting cavity resonators for linear accelerators often have complicated geometrical shapes. One of the best known resonator shapes is called the "Omega structure," because of its characteristic shape. It is shown, for example, in the previously mentioned article by C. Passow (see page 344, FIG. 1.) During the production of these resonators, it is often advantageous to first produce the component pieces of the carrier structure and to join these component parts by electron beam welding.

Figure 5A:
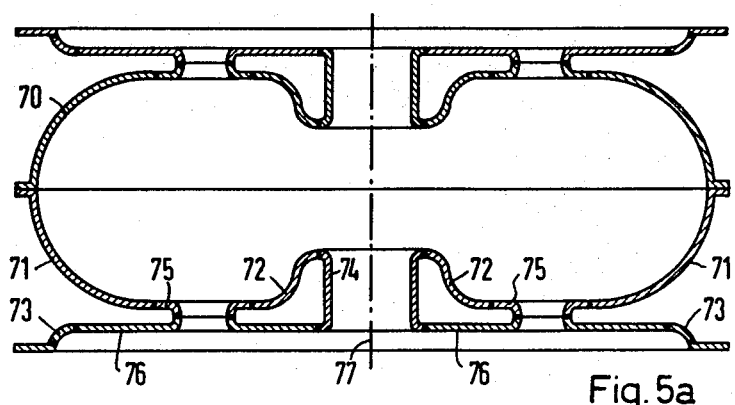
Figure 5B:
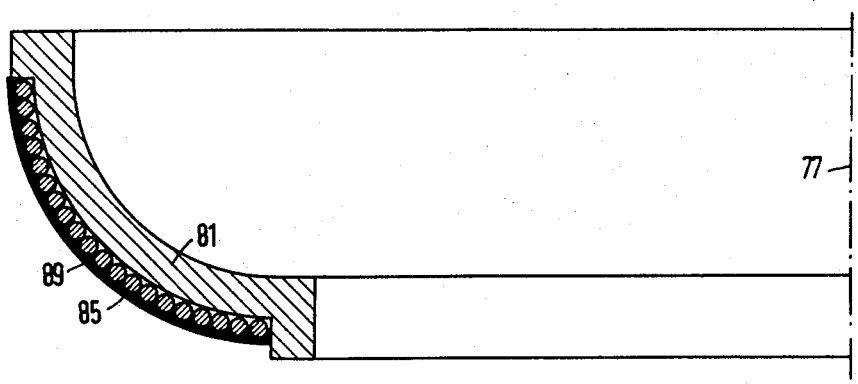
Figure 5C:
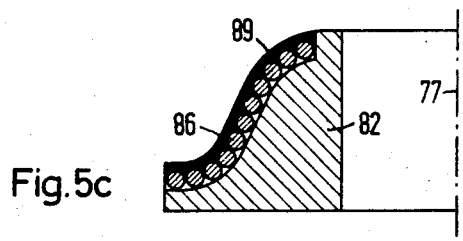

FIGS. 5a to 5f serve to illustrate the production of one half of such an Omega structure. FIG. 5a shows, for a better clarification, the desired shape of the resonator structure. The upper half 70, which may be produced exactly in the same fashion as the lower half, is indicated only schematically. The lower half of the Omega structure indicates the individual component pieces 71 to 76, from which this half is to be made. The production of component parts 71 to 74 which are in rotation-symmetry around the center axis of the Omega structure, is carried out with the aid of niobium wire windings. To this end, as illustrated (in enlarged scale) by FIGS. 5b to 5e, four rotation-symmetrical copper bodies 81 to 84, which are adjusted to the desired inside dimensions of component pieces 71 to 74, are first produced. Their outside is tightly wrapped with one layer of niobium wire windings 85 to 88. To effect a mechanical connection of the niobium wire windings, a niobium layer 89 is then precipitated by fused bath electrolysis, on the outer side of these windings. After the removing of the copper bodies, the inside of the wire windings is then coated, according to FIGS. 3d and 3e, with niobium until a smooth surface is obtained. The component pieces of the carrier structure thus produced, are interconnected, as shown in FIG. 5f or connected with component pieces 75 and 76, fashioned by deep pulling, of niobium laminations, by means of electron beam welding. The weld seams are indicated with 90. Following welding, the carrier structure is preferably preannealed and subjected to a surface treatment by mechanical, chemical and electrolytical polishing. Thereafter, the niobium layer 91 is precipitated by fused bath electrolysis, upon the inside of the carrier structure. This may be done by using a device as in FIG. 2, however the shape of the niobium anode is preferably made to conform to the shape of the surface of the carrier structure, to be coated. Following the precipitation of the niobium layer, the coated carrier structure is then subjected to the degassification annealing process, under a high vacuum.

The carrier structure may be completely comprised of component pieces which are produced of niobium sheet, by the deep pulling method. This is schematically illustrated in FIG. 6. The component pieces, 100 to 104 comprised of niobium laminations, are connected with each other by electron beam welding seams 105 and are coated at the inside of the resonator cavity, with a niobium layer 106, precipitated by fusion electrolysis. The individual annealing processes and the surface treatments may be effected in a similar manner as is employed during the production of the cylindrical cavity resonators.

We claim:

1. A process for producing a superconductive cavity resonator by precipitation of a niobium layer on the surface of a metallic carrier structure which comprises forming a carrier structure of niobium, forming a niobium layer on the inner side of the carrier structure by molten bath electrolysis and then degassing the layered carrier structure under high vacuum.

2. The process of claim 1, wherein the surface of the carrier structure prior to the precipitation of the niobium layer or the surface of the deposited niobium layer is polished, mechanically, chemically or electrolytically.

3. The method of claim 1, wherein a niobium layer of at least 0.3 mm. thick is precipitated on the inner side of the carrier structure by fused bath electrolysis and the layered carrier structure is annealed under a residual pressure of a maximum of $5 \cdot 10^{-8}$ torr for about 15 hours at a temperature between about 2000 and 2050° C.

4. The method of claim 3, wherein the carrier structure is of a niobium sheet.

5. The process of claim 4, wherein the carrier structure is of a deep pulled niobium sheet.

6. The process of claim 5, wherein component pieces of niobium laminations are joined together by electron beam welding prior to precipitation of the niobium layer.

7. The process of claim 1, wherein the carrier structure for the molten bath electrolysis deposition of a niobium layer is annealed for several hours under high vacuum at a temperature of at least 2000° C.

8. The process of claim 7, wherein the annealing of the carrier structure is carried out in a high vacuum with a residual gas pressure of a maximum of $5 \cdot 10^{-8}$ torr for about 3 hours at a temperature between about 2000 and 2050° C.

9. The process of claim 1, wherein the carrier structure is produced by tightly wrapping a single layer of niobium wire around a rotational-symmetrical body having the same shape as the carrier structure to be produced, depositing niobium by fused bath electrolysis on the outside of the niobium wire, removing the rotational-symmetrical body and thereafter depositing niobium by fused bath electrolysis on the inside of the niobium wire.

10. The process of claim 9, wherein the fused bath electrolysis is carried out in many steps and the deposited niobium layer is mechanically or electrolytically polished between the steps.

11. The process of claim 9, wherein the niobium wire has a quadrangular profile, which provides an essentially smooth surface of the wire winding at the surface which faces the rotational-symmetrical body.

9

12. The process of claim 9, wherein components are formed by winding niobium wire around rotational-symmetrical bodies and depositing niobium by fused bath electrolysis to mechanically connect the wire windings, removing the rotational-symmetrical bodies and interconnecting the components by electron beam welding.

13. The process of claim 12, where deep pulled niobium sheets and components formed by winding rotational-symmetrical bodies with niobium wire and electro-depositing niobium from a fused bath, are joined together by electric beam welding to form the carrier structure.

References Cited

UNITED STATES PATENTS 3,444,058   5/1969   Mellors et al. _____ 204—39

JOHN H. MACK, Primary Examiner

R. L. ANDREWS, Assistant Examiner

U.S. Cl. X.R.

204—16, 26, 38 B, 39, 140.5